US012686400B2

(12) United States Patent
Nguemo et al.

(10) Patent No.: US 12,686,400 B2
(45) Date of Patent: Jul. 21, 2026

(54) APPARATUS AND METHOD FOR PRODUCING A CONTROLLER

(71) Applicant: Robert Bosch GmbH, Stuttgart (DE)

(72) Inventors: Theophane Christ Nguedia Nguemo, Schwaebisch Gmuend (DE); Philipp Rumschinski, Villingen-Schwenningen (DE); Stefan Gruener, Auenwald (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 18/678,868

(22) Filed: May 30, 2024

(65) Prior Publication Data

US 2024/0409108 A1       Dec. 12, 2024

(30) Foreign Application Priority Data

Jun. 6, 2023    (DE) ..................... 10 2023 205 256.3

(51) Int. Cl.
*B60W 50/06* (2006.01)
*B60W 10/20* (2006.01)
*B60W 50/00* (2006.01)

(52) U.S. Cl.
CPC ............ *B60W 50/06* (2013.01); *B60W 10/20* (2013.01); *B60W 2050/0011* (2013.01); *B60W 2050/0022* (2013.01); *B60W 2510/08* (2013.01); *B60W 2710/10* (2013.01); *B60W 2710/20* (2013.01)

(58) Field of Classification Search
CPC ................ B60W 50/06; B60W 10/20; B60W 2050/0011; B60W 2050/0022; B60W 2510/08; B60W 2710/20; B62D 6/002; B62D 5/0457; B62D 5/0421; B62D 3/12; B62D 5/046
USPC .......................................................... 701/41
See application file for complete search history.

(56) References Cited

U.S. PATENT DOCUMENTS

2020/0346687 A1* 11/2020 Sakaguchi ......... B62D 15/0235
2021/0179167 A1*  6/2021 Boos ........................ B62D 6/10

* cited by examiner

*Primary Examiner* — Yi-Kai Wang
(74) *Attorney, Agent, or Firm* — Maginot, Moore & Beck LLP

(57) ABSTRACT

A method is for manufacturing a controller for a control section including a rack of a steering system of a vehicle. The method includes providing measurements characterizing an actual behavior of the control section at different operating points, and specifying a target behavior of the rack. The method also includes determining functions modeling a deviation of the actual behavior from the target behavior at a respective operating point for each one of the different operating points depending on the measurements. At least one parameter of the controller affects an actual transmission behavior of the control section. The at least one parameter includes a proportional gain factor, an integral gain factor, and/or a differential gain factor of the controller, and is determined depending on the deviations determined for the different operating points, such that the control section has a specified target transmission behavior.

10 Claims, 3 Drawing Sheets

APPARATUS AND METHOD FOR PRODUCING A CONTROLLER

This application claims priority under 35 U.S.C. § 119 to patent application no. DE 10 2023 205 256.3, filed on Jun. 6, 2023 in Germany, the disclosure of which is incorporated herein by reference in its entirety.

The disclosure relates to an apparatus and method for manufacturing a controller.

BACKGROUND

Controllers are used to control vehicle systems. Improvements to the way that controllers are manufactured are desired.

SUMMARY

A method for manufacturing a controller for a control section, in particular a control section comprising a rack of a steering system of a vehicle, wherein measurements characterizing an actual behavior of the control section at different operating points are provided, wherein a target behavior of the control section, the rack in particular, is specified, functions modeling a deviation of the actual behavior from the target behavior at the respective operating point for one of the different operating points being determined depending on the measurements, at least one parameter of the controller affecting an actual transmission behavior of the control section, in particular a proportional gain factor, an integral gain factor, or a differential gain factor of the controller, being determined depending on the deviations determined for the different operating points, such that the control section has a specified target transmission behavior. An actual transfer behavior that consistently follows the target transfer behavior is thereby achieved.

In one embodiment of the method, a value is determined depending on the deviations and characterizes a maximum deviation of the deviations from the target behavior, wherein the at least one parameter is determined for minimizing the value and/or a difference between the target transmission behavior and the actual transmission behavior. Consistent control at different operating points is thereby achieved.

In one embodiment of the method, a model of a control section to be controlled by means of the controller is specified, in particular a control section comprising the rack, wherein the functions respectively comprise the model and a part for modeling a variation of the control section, wherein at least one of the parts for modeling the variation of the control section is approximated depending on at least one of the measurements. Consistent control for different variations is thereby achieved.

It may be provided that the actual behavior is determined depending on a rotor position of a rotor of a motor for displacing the rack. The controller can thus be integrated in steering systems which provide the rotor position.

In one embodiment of the method, the actual behavior is controlled by the controller by means of the at least one specified parameter. This means that the controller is automatically parameterized and the steering system is controlled by means of the parameterized controller.

An apparatus for manufacturing a controller for a control section, in particular a control section comprising a rack of a steering system of a vehicle, is configured for providing measurements characterizing an actual behavior of the control section at different operating points, for specifying a target behavior of the control section, the rack in particular, for determining functions modeling a deviation of the actual behavior from the target behavior at the respective operating point for one of the different operating points depending on the measurements, for determining at least one parameter of the controller affecting an actual transmission behavior of the control section, in particular a proportional gain factor, an integral gain factor, or a differential gain factor of the controller, depending on the deviations determined for the different operating points, such that the control section has a specified target transmission behavior. A controller is thus provided for controlling the control section such that an actual transmission behavior is achieved, which consistently follows the target transmission behavior.

It may be provided that the apparatus is configured for determining a value, depending on the deviations, characterizing a maximum deviation of the deviations from the target behavior, and for determining the at least one parameter for minimizing the value and/or a difference between the target transmission behavior and the actual transmission behavior. The controller is thus provided such that consistent control can be achieved by means of the controller at different operating points.

It may be provided that the apparatus is configured for specifying a model of a control section to be controlled by means of the controller, in particular a control section comprising the rack, wherein the functions respectively comprise the model and a part for modeling a variation of the control section, and for approximating at least one of the parts for modeling the variation of the control section depending on at least one of the measurements. The controller is thereby configured to achieve consistent control for different variations.

It may be provided that the controller is configured to control a deviation between the target behavior and the actual behavior, wherein the apparatus is configured to determine the actual behavior depending on a rotor position of a rotor of a motor for displacing the rack. The controller is thus provided for steering systems which provide the rotor position.

A vehicle comprising the apparatus has advantages corresponding to those of the apparatus. This means that the controller can be parameterized automatically and the steering system can be controlled by means of the parameterized controller.

BRIEF DESCRIPTION OF THE DRAWINGS

Further advantageous embodiments will become apparent from the following description and the drawing. The drawings show.

DETAILED DESCRIPTION

Figure 1:
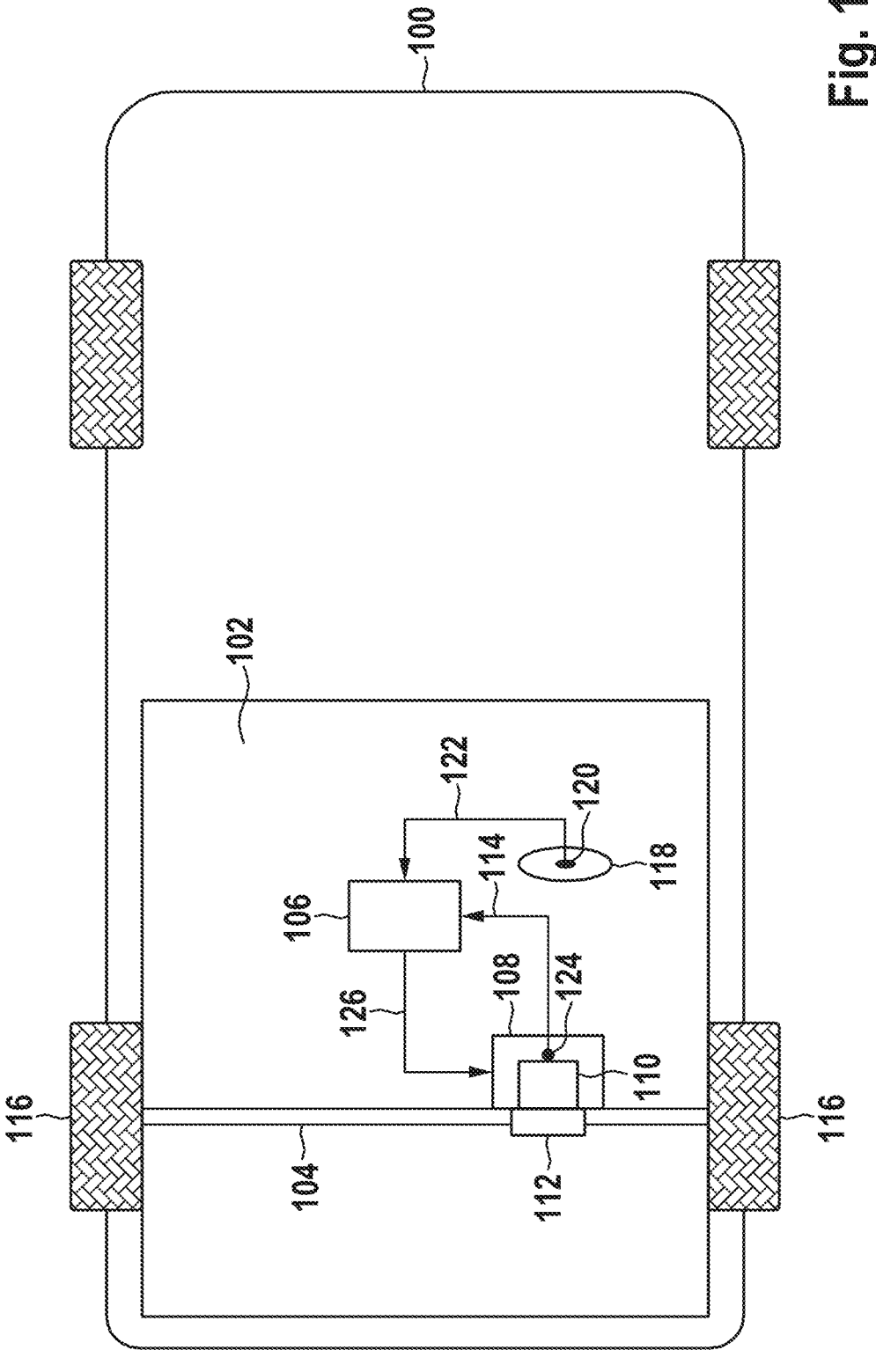
FIG. 1 a schematic illustration of a vehicle having a steering system and a controller for an actual behavior of a rack of the steering system, FIG. 2 a schematic illustration of an apparatus for manufacturing the controller, FIG. 3 a flow chart of a method for manufacturing the controller.

A vehicle 100 having a steering system 102 is shown schematically in FIG. 1.

The steering system 102 comprises a rack 104. The vehicle 100 comprises a controller 106 for controlling an actual behavior of the rack 104.

The steering system 102 comprises a motor 108 having a rotor 110. The motor 108 is configured to displace the rack 104 by means of a gearbox 112.

In the example, the controller 106 is configured to determine the actual behavior of the rack 104 depending on a rotor position 114. In the example, the controller 106 is configured to control the actual behavior of the rack 104 depending on a target behavior for the rack 104.

The actual behavior is, for example, an actual position of the rack 104. The target behavior is, for example, a target position of the rack 104.

Manufacturing the controller 106 includes parameterizing the same. The controller 106 and the manufacturing thereof are described in the context of rack position control of a steer-by-wire steering system. The controller 106 may be used, when parameterized accordingly, to control other sizes and systems.

In the vehicle 100 having the steer-by-wire steering system, steerable wheels 116 and a steering wheel 118 are connected by means of electrical signals. A torque exerted by a driver on the steering wheel 118 therefore has no direct mechanical influence on the steered wheels 116. The steer-by-wire steering system comprises two sub-components: a first sub-component for ascertaining the driver's intention by means of the steering wheel 118 and a second sub-component, a steering rack actuator, mechanically connected to the steered wheels 116 by means of the rack 104.

A driver direction specification 122 ascertained at the steering wheel 118 by means of a sensor 120 is sent to the controller 106. Said controller controls a wheel steering angle of the steered wheels 116.

A control loop is closed by means of the controller 106. The control loop comprises a sensor 124 configured to measure the rotor position 114 and to feed back the same to the controller 106.

In the example, the controller 106 is configured to actuate the motor 108 by means of a corresponding control parameter 126 to alter the rotor position 114.

To ensure a good driving experience, the controller 106 is configured to well reflect a vehicle response to steering wheel input by the driver captured at the steering wheel 118. For example, the controller 106 is configured such that a time delay between steering wheel movement and a movement of the steered wheels 116 has a defined behavior. For example, the controller 106 is configured such that the vehicle 100 follows a reference trajectory from the driver captured at the steering wheel 118.

A driver's specification or reference trajectory captured at the steering wheel 118 is described at the steering rack actuator by the target behavior for the rack 104. Movements of the steered wheels 116 are caused by the lateral movements of the rack 104. The controller 106 is configured to control the steering rack actuator such that the steering rack actuator adjusts an actual position of the rack 104 with a specified accuracy in different travel situations.

The controller 106 is configured to control the steering rack actuator such that the steering rack actuator implements a dynamic that is robust against external interference.

The controller 106 is configured to calculate the actual position of the rack 104 from the rotor position 114.

The controller 106 is configured to regulate a defined behavior of a difference between target behavior and actual behavior of the rack 104 for vehicle speeds and travel situations achievable by means of the vehicle 100. The controller 106 is configured to regulate a consistent behavior of the steering rack actuator, i.e., remaining as consistent as possible across vehicle speeds and travel situations achievable by means of the vehicle 100.

In the control loop, vehicle feedback is considered to be interference for the controller 106. The controller 106 is configured to control the steering rack actuator such that a variation in vehicle response with vehicle speed will affect a driving feel or lateral dynamic of the steering rack actuator as little as possible.

In the example, the controller 106 is designed such that the control circuit fulfills a defined specification. For example, a guiding behavior is specified, i.e., a target behavior of the rack 104 relative to an actual behavior of rack 104 or an acoustic behavior of rack 104.

In the example, characteristics of the steered vehicle axle, i.e., the axle comprising the steered wheels 116, are considered for the speeds achievable by means of the vehicle 100 in the manufacture of the controller 106.

Figure 2:
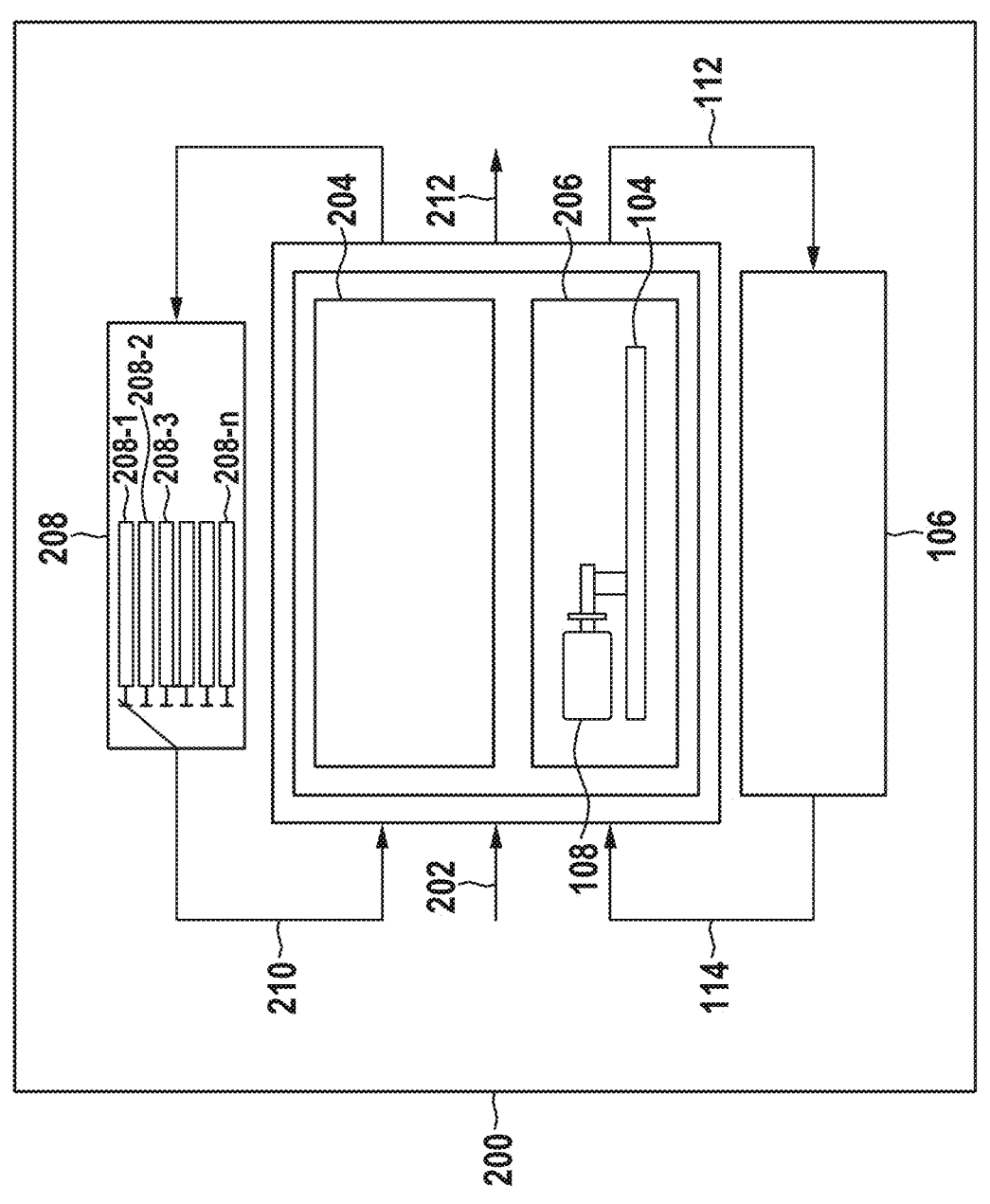

In FIG. 2, an apparatus 200 for manufacturing the controller 106 is shown schematically. The apparatus 200 may be integrated in the vehicle 100.

The apparatus 200 is configured to provide measurements 202 characterizing an actual behavior at different operating points.

For example, measurements 202 captured in the vehicle 100 are provided.

In the example, a vehicle response is analyzed by specific maneuvers recorded in the measurements 202.

The apparatus 200 is configured to provide a target transmission behavior 204. For example, the device 200 is configured to specify the target transmission behavior of the control section 206 depending on the target behavior 204.

In the example, the device 200 is configured to specify the target transmission behavior 204 for a control section 206 in the frequency range and/or in the time range.

In the example, the control section 206 comprises the rack 104 and the motor 108.

In the example, an actual transmission behavior of the control section 206 is to be consistent for travel situations applicable to the vehicle 100 and over a speed range intended for the vehicle 100. For example, the apparatus 200 is configured to determine the actual transmission behavior of the control section 206 depending on the actual behavior of the rack 104.

The apparatus 200 is configured to determine at least one parameter of the controller 106 determining a control behavior of the controller 106 such that the control section 206 has the specified target transmission behavior 204. In the example, the apparatus 200 is configured to determine the at least one parameter of the controller 106 for minimizing a difference between the target transmission behavior 204 and the actual transmission behavior.

Examples of the at least one parameter are a proportional gain factor, an integral gain factor, or a differential gain factor of the controller 106.

In the example, the apparatus 200 is configured to determine the at least one parameter depending on the measurements 202.

In one embodiment, the apparatus 200 is configured to determine functions 208 depending on the measurements 202 for modeling a respective deviation 210 of the actual behavior from the desired behavior 204 at the respective operating point for one of the different operating points. For example, the particular deviation 210 of the actual behavior from the target behavior 204 is modeled linearly at the operating point. In the example, n functions 208-1, 208-2, 208-3, . . . , 208-*n* for n operating points are shown.

For example, local approximations are determined by an analysis of the measurements 202. The functions 208 model a behavior of the steered vehicle axle at different operating points. The device 200 is configured to determine an instantaneous operating point of the vehicle 100, e.g., depending on an instantaneous vehicle speed or travel situation, and to select the function provided for said operating point for approximation. In the example, the functions 208 approximate the behavior by means of linear models. In this way, a complex dynamic of the steered vehicle axis is formulated as local linear functions.

In the example, the vehicle response depending on the particular operating point is formulated as a structured model error based on a deviation of the actual transmission behavior of the control section 206 from the target transmission behavior 204.

In the example, the apparatus 200 is configured to specify a model of the control section 206 to be controlled by means of the controller 106.

The functions 208 each comprise the model and a part for modeling a variation of the control section 206.

The apparatus 200 is configured to approximate at least one of the parts modeling the variation of the control section 206 depending on at least one of the measurements 202.

The particular deviation 210 represents a particular vehicle response. Due to the variation of the control section 208, the vehicle responses deviate from one another.

The apparatus 200 is configured to determine a value 212 characterizing a maximum deviation of the deviations 210 from the target behavior, depending on the deviations 210. In the example, the apparatus 200 is configured to determine the at least one parameter of the controller 106 which minimizes the value 212.

In the example, the apparatus 200 is configured to determine the at least one parameter of the controller 106 which minimizes the deviation 210, depending on the deviations 210.

Figure 3:
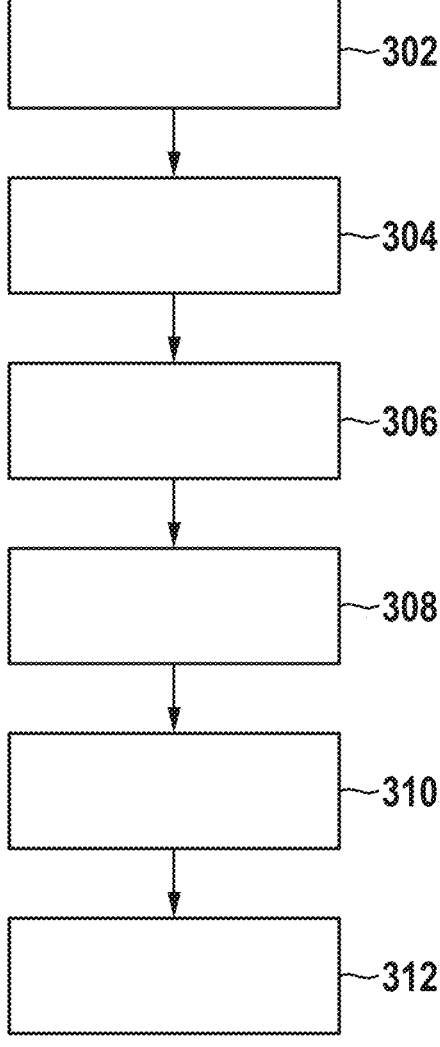

In FIG. 3, a flowchart having steps from a method for manufacturing the controller 106 is shown.

The method comprises a step 302.

At step 302, the measurements 202 characterizing the actual behavior of the control path 206 at different operating points are provided.

For example, the actual behavior is determined depending on the rotor position 114 of the rotor.

The method comprises a step 304.

At step 304, the target behavior 204 of the control section 206 is specified.

Subsequently, a step 306 is carried out.

At step 306, the functions 208 for linearly modeling a deviation 210 of the actual behavior from the target behavior 204 at the respective operating point are determined for each one of the different operating points depending on the measurements 202.

In the example, the model of the control section 206 to be controlled by means of the controller 106 is specified.

The functions 208 each comprise the model and a part for modeling a variation of the control section 206.

In the example, at least one of the parts for modeling the variation of the control section 206 is approximated depending on at least one of the measurements 202.

Subsequently, a step 308 is carried out.

At step 308, the value 212 characterizing the maximum deviation of the deviations 210 from the target behavior 204 is determined depending on the deviations 210.

Subsequently, a step 310 is carried out.

At step 310, the at least one parameter of the controller 106 is determined depending on the deviations determined for the different operating points.

The at least one parameter is determined such that the control section 206 has the specified target transmission behavior 204.

In the example, the at least one parameter for minimizing the value 212 and the difference between the target transmission behavior and the actual transmission behavior is determined.

For example, the at least one parameter is determined by means of a μ synthesis. The functions 208, e.g., represent an erroneous section model, $G_\mu$ in particular an upper linear fractional transformation F of a block diagonal error transfer matrix ΔL with respect to a suitably extended transfer matrix G of the control section 208, e.g., the steering rack actuator:

$$G_\mu = F(G, \Delta L)$$

The controller 106 parameterized in this way has standardized step responses at the operating points.

The controller 106 parameterized in this way is preferably used to control the control section 208.

Optionally, a step 312 is performed. At step 312, the actual behavior is controlled by the controller 106 by means of the at least one specified parameter.

The method is preferably performed automatically, wherein measurements are taken in the vehicle 100 and the controller 106 is automatically parameterized.

What is claimed is:

1. A method for parameterizing a controller for a control section of a steering system of a vehicle, the method comprising:
   providing measurements characterizing an actual behavior of the control section at different operating points;
   providing a target behavior of the control section at the different operating points; and
   determining functions modeling a deviation of the actual behavior from the target behavior at a respective operating point of the different operating points based on a corresponding measurement of the measurements for at least one operating point of the different operating points,
   wherein at least one parameter of the controller affects an actual transmission behavior of the control section,
   wherein the at least one parameter includes a proportional gain factor, an integral gain factor, or a differential gain factor of the controller,
   wherein the controller is parameterized based on the functions, such that the at least one parameter has a value based on the deviation at the respective operating point, and
   wherein the control section has a specified target transmission behavior when controlled by the parameterized controller that results in the actual transmission behavior consistently following the specified target transmission behavior.

2. The method according to claim 1, further comprising:
   determining a value depending on the deviation and characterizing a maximum deviation of the deviation from the target behavior; and
   determining the at least one parameter for minimizing the value and/or a difference between the specified target transmission behavior and the actual transmission behavior.

3. The method according to claim 1, further comprising:

specifying a model of the control section to be controlled using the controller, wherein the control section includes a rack of the steering system, wherein the functions each comprise the model and a part for modeling a variation of the control section, and wherein at least one of the part for modeling the variation of the control section is approximated depending on at least one of the measurements.

4. The method according to claim 1, wherein;

the control section includes a rack of the steering system, and the actual behavior is determined depending on a rotor position of a rotor of a motor for displacing the rack.

5. The method according to claim 1, wherein the actual behavior is controlled by the controller based on the at least one parameter.

6. An apparatus for parameterizing a controller for a control section of a steering system of a vehicle, the apparatus comprising:

a processor configured to:

receive measurements characterizing an actual behavior of the control section at different operating points;

receive a target behavior of the control section at the different operating points, determine functions modeling a deviation of the actual behavior from the target behavior at a respective operating point of the different operating points based on a corresponding measurement of the measurements for at least one operating point of the different operating points, determine at least one parameter of the controller affecting an actual transmission behavior of the control section, the at least one parameter including a proportional gain factor, an integral gain factor, and/or a differential gain factor of the controller, and the at least one parameter determined depending on the deviation at the respective operating point, and parametrize the controller based on the at least one parameter, such that the control section has a specified target transmission behavior when controlled by the parameterized controller that results in the actual transmission behavior consistently following the specified target transmission behavior.

7. The apparatus according to claim 6, wherein the apparatus is configured to determine a value characterizing a maximum deviation of the deviation from the target behavior, depending on the deviation, and to determine the at least one parameter minimizing the value and/or a difference between the specified target transmission behavior and the actual transmission behavior.

8. The apparatus according to claim 6, wherein:

the apparatus is configured to specify a model of a control section to be controlled using the controller, the control section including a rack of the steering system, and the functions each comprise the model and a part for modeling a variation of the control section, and approximate the part for modeling the variation of the control section depending on at least one of the measurements.

9. The apparatus according to claim 6, wherein:

the controller is configured to control a deviation between the target behavior and the actual behavior, and the controller is configured to determine the actual behavior depending on a rotor position of a rotor of a motor configured to displace a rack of the steering system.

10. A vehicle comprising the controller and the apparatus according to claim 6.

* * * * *